United States Patent

Koppel et al.

[11] Patent Number: 5,961,077
[45] Date of Patent: Oct. 5, 1999

[54] METHOD AND A SYSTEM FOR LAUNCHING SATELLITES SIMULTANEOUSLY ON NON-COPLANAR ORBITS BY USING HIGHLY ECCENTRIC ORBITS AND ATMOSPHERIC BRAKING

[75] Inventors: Christophe Koppel, Nandy; Dominique Valentian, Rosny, both of France

[73] Assignee: Societe Nationale D'Etude et de Construction de Moteurs D'Aviation, Paris, France

[21] Appl. No.: 09/000,978

[22] Filed: Dec. 30, 1997

[30] Foreign Application Priority Data

Dec. 31, 1996 [FR] France .................... 96 16276

[51] Int. Cl.⁶ .............. B64G 1/00; B64G 1/24; B64G 1/40
[52] U.S. Cl. ............ 244/158 R; 244/164; 244/172
[58] Field of Search ............ 244/158 R, 164, 244/172

[56] References Cited

U.S. PATENT DOCUMENTS

| | | | |
|---|---|---|---|
| 3,907,225 | 9/1975 | Welther | 244/158 R |
| 4,504,031 | 3/1985 | Andrews | 244/172 |
| 5,199,672 | 4/1993 | King et al. | 244/158 R |
| 5,393,017 | 2/1995 | Smith et al. | |
| 5,595,360 | 1/1997 | Spitzer | 244/158 R |
| 5,681,011 | 10/1997 | Frazier | 244/164 |
| 5,716,029 | 2/1998 | Spitzer et al. | 244/158 R |

OTHER PUBLICATIONS

Vinh et al., Nguyen X., "Explicit Guidance of Drag–Modulated Aeroassisted Transfer Between Elliptical Orbits" Journal of Guidance, Control, and Dynamics, vol. 9, No. 3, May 1986, Austin, Texas, pp. 274–280.

Mathews et al., Michael, "Efficient Spacecraft Formation-keeping With Consideration of Ballistic Coefficient Control" AIAA 26th Aerospace Sciences Meeting, Jan. 11–14/ 1988, Reno, Nevada.

Atzei et al., A., "Soho and Cluster: Europe's Possible Contribution to the ISTP" ESA Bulletin, No. 41, Feb. 1985, Paris, France, pp. 21–28.

Fu, Ho–Ling et al., "On the High Eccentricity Aerobraking Orbit Transfer Problem, with Parametric Analysis and Numerical Study" Ph.D. Thesis, Colorado University, Boulder, Colorado, Jan. 1992.

*Primary Examiner*—Michael J. Carone
*Assistant Examiner*—Charles R. Ducker, Jr.
*Attorney, Agent, or Firm*—Weingarten, Schurgin, Gagnebin & Hayes LLP

[57] ABSTRACT

A launcher places a first satellite practically directly on a final orbit. A second satellite carried by the same launcher is initially transferred onto a waiting orbit that is highly elliptical, having a semi-major axis situated in the initial orbital plane. The inclination and the perigee of the waiting orbit are then changed in the vicinity of the apogee of the waiting orbit, thereby placing the second satellite on an intermediate orbit. A maneuver is performed that includes at least one step making use of atmospheric braking in the vicinity of perigee of the intermediate orbit so as to lower the altitude of apogee of the intermediate orbit, and an impulse is supplied to the second satellite at apogee of the intermediate orbit so as to raise its perigee and transform the intermediate orbit into a final orbit having orbital parameters whose values are substantially different from those of the orbital parameters of the final orbit of the first satellite.

16 Claims, 3 Drawing Sheets

METHOD AND A SYSTEM FOR LAUNCHING SATELLITES SIMULTANEOUSLY ON NON-COPLANAR ORBITS BY USING HIGHLY ECCENTRIC ORBITS AND ATMOSPHERIC BRAKING

FIELD OF THE INVENTION

The present invention relates to a method and to a system for launching satellites simultaneously on non-coplanar orbits, in which a first satellite is put on a launcher suitable for placing said first satellite practically directly on a first final orbit having first orbital parameters with a first eccentricity value, a first inclination value, and a first apogee value, and in which at least one second satellite is put on the launcher to be placed on a second final orbit having second orbital parameters with a second eccentricity value, a second inclination value, and a second apogee value which are substantially different from the corresponding values of the first orbital parameters provided by the launcher and applied to the first satellite launched simultaneously with the second satellite.

PRIOR ART

Double or multiple satellite launches are generally performed on orbits that are coplanar and of similar eccentricity.

In some cases, such as the second launch of the H-2 launcher, the last stage of the launcher is reignited to place a second satellite in a geostationary transfer orbit after a first satellite has been placed in a low circular orbit, prior to reigniting the last stage of the launcher. Under such circumstances, the orbits of the two satellites placed on the same launcher nevertheless remain practically coplanar.

Unfortunately, there is considerable demand for satellites to be placed on orbits that are not coplanar, in particular for a first satellite to be placed on a low circular orbit that is inclined and preferably polar, and a second satellite on an orbit that is geostationary, or indeed to place a plurality of satellites on orbits at inclinations that are very different (0°, 55°, and 65°, for example).

In practice, that kind of mission has never been considered a possibility since changing inclination in low orbit by conventional means is very expensive. For example, the speed increment necessary for passing from a heliosynchronous polar orbit to an equatorial low circular orbit is 11 km/s which is as large as the increment required for launching a probe into lunar orbit starting from the earth!

When launching a single satellite, advantage has already been taken of the laws of celestial mechanics whereby the increments of speed to be supplied to change the inclination of the orbit of a satellite decreases with increasing apogee of the transfer orbit.

This feature is used, in particular, by the PROTON launcher, to put a single satellite into geostationary orbit: the satellite is placed on a super-synchronous orbit, and inclination is corrected (through about 50°) at apogee (situated in the altitude range 50,000 km to 90,000 km), thereby making it possible to optimize the total speed increment that needs to be supplied. Under such circumstances, the speed increment required is as little as a few hundreds of meters per second (m/s).

The greater the eccentricity of the orbit, the smaller the required speed increments. Also, increasing orbit apogee beyond 36,000 km does not require a large speed increment.

Gravitational assistance from the moon can be used to change inclination. Thus, in a French patent application in the name of Société Européene de Propulsion, filed on the same day as the present patent application, there is described a method and a system for launching satellites simultaneously on non-coplanar orbits while using gravitational assistance from the moon. In that case, the speed increment enabling the inclination of an orbit to be changed is provided by gravitational assistance from the moon. Nevertheless, the use of the gravitation reaction lengthens the maneuver from 7 days to 28 days. Unfortunately, there exist cases where it can be desirable to have a transfer time that is shorter, and consequently in which it is preferable for the speed increment to be obtained not by gravitational assistance from the moon but to be achieved by means of a propulsive stage.

OBJECT AND BRIEF SUMMARY OF THE INVENTION

The invention seeks to make it possible, at low cost, to launch satellites simultaneously for placing on orbits that are not coplanar.

More particularly, the invention seeks to reduce significantly the amount of energy used by the propulsion systems located on a satellite to be placed in orbit but which is not placed directly on an orbit close to their final orbit by the launcher used for all of the satellites, and to do so without making use of gravitational assistance from the moon.

These objects are achieved by a method of launching satellites simultaneously on non-coplanar orbits, in which a first satellite is put on a launcher suitable for placing said first satellite practically directly on a first final orbit having first orbital parameters with a first eccentricity value, a first inclination value, and a first apogee value, and in which at least one second satellite is put on the launcher to be placed on a second final orbit having second orbital parameters with a second eccentricity value, a second inclination value, and a second apogee value which are substantially different from the corresponding values of the first orbital parameters provided by the launcher and applied to the first satellite launched simultaneously with the second satellite, wherein, to place the second satellite on its orbit, a first maneuver is performed to transfer it onto a highly elliptical waiting orbit having an apogee that is situated typically in the range 50,000 km to 400,000 km, and having a semi-major axis situated in the initial orbit plane, during a second maneuver (situated in the vicinity of the apogee of the waiting orbit), the inclination and the perigee of the waiting orbit are changed to place the second satellite on an intermediate orbit, a third maneuver is performed for mid-course correction of the intermediate orbit, a fourth maneuver is performed, including at least one step that makes use of atmospheric breaking in the vicinity of the perigee of the intermediate orbit, to lower the altitude of the apogee of the intermediate orbit, and a fifth maneuver is performed during which an impulse is supplied to the second satellite at apogee of the intermediate orbit so as to raise its perigee and transform the intermediate orbit into said second final orbit constituted by an inclined low orbit.

The period TA of the waiting orbit is determined so that the apogee of said waiting orbit is visible from a ground station, and the second maneuver which is situated in the vicinity of the apogee of the waiting orbit is controlled from the ground station.

The third maneuver for mid-course correction of the intermediate orbit makes it possible to situate the perigee of the intermediate orbit at an altitude in the range 80 km to 140 km.

The fourth maneuver which includes at least one step implementing atmospheric braking, uses the attitude control of the second satellite in such a manner that the braking axis of said satellite is substantially in alignment with its velocity vector.

In a particular implementation, the fourth maneuver comprises a set of steps implementing atmospheric braking so as to lower the apogee altitude of the intermediate orbit at each step.

The invention also provides a method of launching a plurality of second satellites simultaneously onto final orbits constituted by low altitude orbits, and in particular low circular orbits of different inclinations, while a first satellite is placed on a first final orbit constituted by a geostationary transfer orbit of low inclination, or by a super-geostationary transfer orbit, wherein during the second maneuver, a mid-course correction at the go half-orbit position of the waiting orbit is performed separately on each second satellite enabling each second satellite to aim for a different change of inclination at apogee of the waiting orbit, and during the third maneuver, a second mid-course correction is performed for each second satellite on each intermediate orbit to adjust the altitude of each perigee of each intermediate orbit.

In a variant, the invention also provides a method of launching a plurality of second satellites simultaneously on final orbits constituted by low altitude orbits while the first satellite is placed on a first final orbit constituted by a geostationary transfer orbit of low inclination, or by a super-geostationary transfer orbit, wherein during the first maneuver, the second satellites are transferred onto slightly different super-synchronous waiting orbits by supplying very small speed increments, and during the second maneuver, identical inclination changes are performed on all of the second satellites so as to place them on intermediate orbits that are similar but having different periods, leading to different times when the various second satellites pass through perigee of the intermediate orbits such that at the end of the fifth maneuver, the various second satellites are placed on the same final orbit constituted by an inclined low orbit, while being at mutually different phases thereon.

The invention also provides a satellite launching system for implementing the above-described method, wherein the system comprises a launcher, a first satellite disposed on the launcher which is adapted to place said first satellite practically directly on a first final orbit, and at least one second satellite designed to be placed on a second final orbit different from said first final orbit, and wherein the second satellite is fitted with an on-board computer and with a chemical thrust system comprising a main thruster on-board said second satellite, and attitude control thrusters.

According to a particular characteristic, said second satellite includes a star sensor, a variable field earth sensor, and an ephemeris table included in the on-board computer making it possible to compute angles between the thrust vector and the earth-satellite direction and the sun-satellite direction, and thus to determine the attitude of the second satellite while maneuvering.

Also, said second satellite may further include gyros controlling the attitude control thrusters causing the body of the second satellite to rotate so as to point the main thruster in the aiming direction.

The invention also provides a launch system for implementing the above-mentioned method, wherein the system comprises a launcher, a first satellite disposed on the launcher which is adapted to place said first satellite practically directly on a first final orbit, and at least one second satellite designed to be placed on a second final orbit different from said first final orbit, and wherein the second satellite is fitted with an on-board computer and also an electrical thrust system comprising at least high specific impulse electrical thrusters on-board said second satellite, the electrical thrusters being capable of being of the ionic type, of the arc jet type, or of the closed electron drift type.

In a particular embodiment, the second satellite includes a variable field earth horizon sensor for obtaining the position of the earth, and reaction wheels for determining the attitude of the second satellite, and the on-board computer implements a control relationship for the electrical thrusters which consist in stabilizing the thrust vector perpendicularly to the earth-satellite direction.

In another particular embodiment, the second satellite includes a star sensor together with an ephemeris table included in the on-board computer to determine the attitude of said second satellite, and reaction wheels for determining the attitude of said second satellite, and the on-board computer implements a control relationship for the electrical thrusters which consist in pointing the thrust vector along an inertial direction.

Advantageously, the body of the second satellite is provided with at least two laser retro-reflectors making it possible by laser telemetry to determine very accurately the position of said second satellite prior to the mid-course correction maneuvers of the third maneuver.

A chemical thrust system and an electrical thrust system can both be installed on the same satellite.

A second satellite may include at least two solar panels that are symmetrical about the body of the second satellite or at least one solar panel and a heat shield.

BRIEF DESCRIPTION OF THE DRAWINGS

Other characteristics and advantages of the invention appear from the following description of particular embodiments of the invention given as examples, with reference to the accompanying drawings, in which.

DETAILED DESCRIPTION OF PARTICULAR EMBODIMENTS OF THE INVENTION

Figure 1:
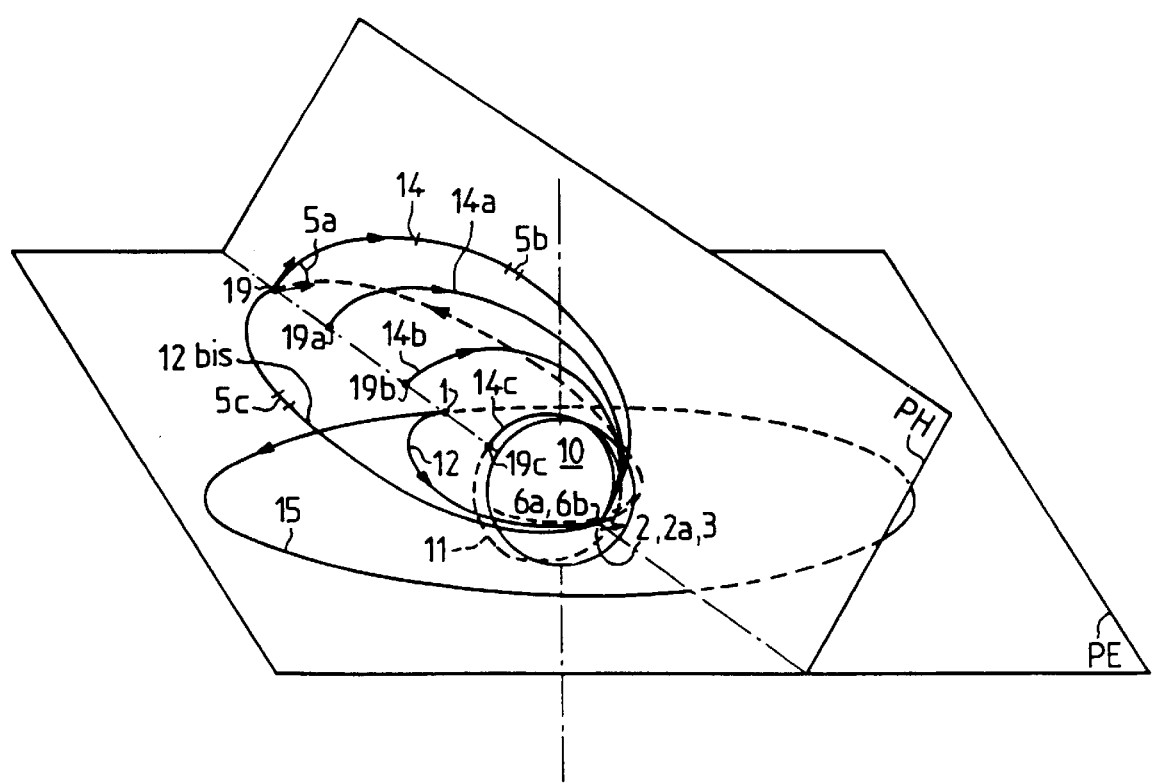
FIG. 1 is a diagram showing one example of the method of the invention for putting a first satellite onto a geostationary orbit and a second satellite transferred from the geostationary orbit to a heliosynchronous orbit.

An implementation of the method of the invention is described with reference to FIG. 1.

Two satellites A and B are installed on a common launcher suitable for placing both satellites A and B on a geostationary transfer orbit 12 about the earth 10.

The first satellite B is released at a point 1 on said orbit 12 to be placed by its own means on a geostationary orbit 15. On passing through perigee 2, satellite A, which may be associated with the top stage of the launcher, receives from the launcher an impulse 2a putting the satellite onto an elliptical waiting orbit 12bis of period TA as defined below. In a variant implementation, satellite A is merely separated from the launcher, and a chemical type main thrust system of satellite A is fired in zone 3. The impulse delivered by the satellite thruster then places the satellite in the waiting orbit 12bis.

When satellite A is at the apogee 19 of the waiting orbit 12bis, and while it is oriented in the appropriate inertial direction by the altitude control system incorporated in the satellite, the main thruster of satellite A is fired to perform a change of inclination 5a which enables the satellite A to be transferred onto an elliptical orbit 14 situated in the heliosynchronous plane, or the intended low circular orbit plane PH. The perigee of the orbit 14 is situated at an altitude lying in the range 80 km to 170 km. In order to refine perigee altitude, a mid-course correction is preferably performed in zone 5b.

Thereafter, the successive perigee passes 6a and 6b are allowed to diminish the apogees 19a, 19b, 19c of the orbit under consideration 14a, 14b, 14c until an orbit is obtained having an apogee that is typically less than 1000 km. In a terminal maneuver, the propulsive system of satellite A delivers an impulse at apogee 19c to circularize the orbit 11, which orbit may be heliosynchronous or inclined.

It is possible to take advantage of node precession due to the flattening of the earth at its poles to adjust the time at which the satellite passes through the up node of the desired heliosynchronous orbit to the desired value.

The above-described string of maneuvers takes the following general considerations into account:

the greater the eccentricity of the orbit (the higher its apogee) the smaller the speed increment required to modify its inclination, such orbits are said to be "super-synchronous";

the additional speed to be delivered by the launcher to pass from a geostationary transfer orbit (GTO) to a super-synchronous transfer orbit is very small (less than 600 m/s), even though the increase in altitude of apogee is considerable (from 36,000 km to 60,000 km–400,000 km); and when it is desired to transform an elliptical orbit into a low circular orbit, there is no need to provide a large braking increment, since atmospheric braking at perigee, over successive passes through the upper atmosphere, makes it possible to reduce the altitude of apogee with minimum expenditure of propellant (correction impulses). In addition, if heat flux while passing through the atmosphere can be limited to 6 kw/m$^2$, there is no need to provide any special protection.

In the context of launching a plurality of satellites simultaneously, the method of the invention thus makes it possible, for at least one of the satellites, to pass from a geostationary transfer orbit to at least one inclined low circular orbit, without calling on gravitational assistance from the moon.

Figure 3:
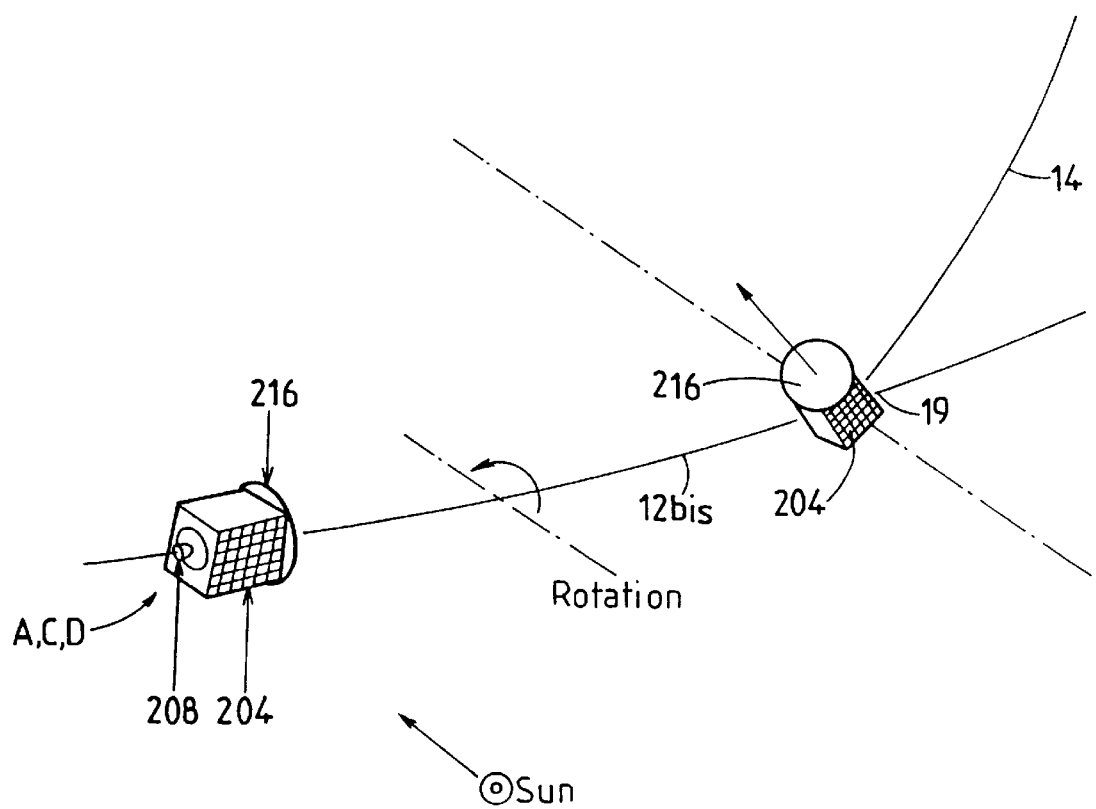
FIG. 3 is a diagram showing how a satellite can be implemented with a heat shield to perform a portion of the maneuvers of the method of the invention, namely an attitude acquisition maneuver and firing at apogee of a highly elliptical waiting orbit to place the satellite on an intermediate orbit.

The method is remarkable in particular because of the following points, illustrated with reference to FIGS. 1 and 3:

1. The first satellite B is placed on a slightly inclined transfer orbit (typically 7° when launching from Kourou) while the second satellite A (or satellite cluster A, C, D) is placed on a transfer orbit 12bis that is highly eccentric and super-synchronous. This orbit 12bis can be obtained either by the top stage of the launcher, or by the thrust system of satellite A or of satellites A, C, and D.

2. In the vicinity of the apogee 19 of the super-synchronous orbit 12bis, satellite A is oriented along the thrust vector to be supplied for obtaining the desired inclination.

The change in inclination preferably takes place close to local noon so that the solar panels remain maximally illuminated.

The change in inclination can be measured by gyros or indeed by simplified star sensors.

3. The main thruster of satellite A (equivalent to the apogee thruster of a geostationary satellite) is fired. Satellite A passes to the orbit 14 of desired inclination.

4. The nominal attitude of satellite A is reestablished (working face facing towards the earth 10).

5. A midway orbital correction is performed in zone 5b for the purpose of adjusting perigee altitude (6a) to the correct value for benefitting from atmospheric braking.

6a. The solar panels of satellite A are oriented relative to its velocity vector so as to obtain stable atmospheric braking (thermal flux less than 6 kw/m$^2$).

7a. Multiple perigee passes enable apogee 19a, 19b to be decreased to the desired value 19c (in the range 600 km to 1200 km).

6b. In an alternative, the solar panels of satellite A are folded behind a heat shield in order to perform atmospheric braking in a single main pass.

7b. Apogee 19 reaches the desired value 19c (directly or after a few orbits for adjusting the apogee altitude to the desired value).

8. Perigee altitude 6b is increased by firing at apogee 19c. The satellite is then on its nominal orbit 11.

The above procedure can be applied to an arbitrary number of satellites (A, C, D) that are launched simultaneously, thus making it possible to launch a constellation on non-coplanar orbits using a single launch.

In an aspect of the invention, constraints of celestial mechanics and of launching are harmonized.

Thus, to benefit from visibility conditions at the ground station controlling satellite A during the second maneuver in the vicinity of apogee 19, it is necessary for the half-period TA of the elliptical orbit 12bis to be equal to a multiple of 12 hours minus the relative longitude between the launch site and the ground station. If the ground station is in the vicinity of the launch site, then the half-period TA of the super-synchronous orbit must be close to a multiple of 12 h or of 24 h. This determines the altitude of the apogee 19.

Also, it should be observed that to transform an elliptical orbit into a low circular orbit, it is not necessary to provide a large braking increment. Successive passes through the upper atmosphere enable atmospheric braking at perigee to reduce the altitude of apogee with a minimum expenditure of propellent (with propellent being required only to perform a few correction impulses). In addition, providing the heat flux can be restricted to 6 kw/m$^2$ when passing through the atmosphere, there is no need for any special thermal protection.

Figure 2:
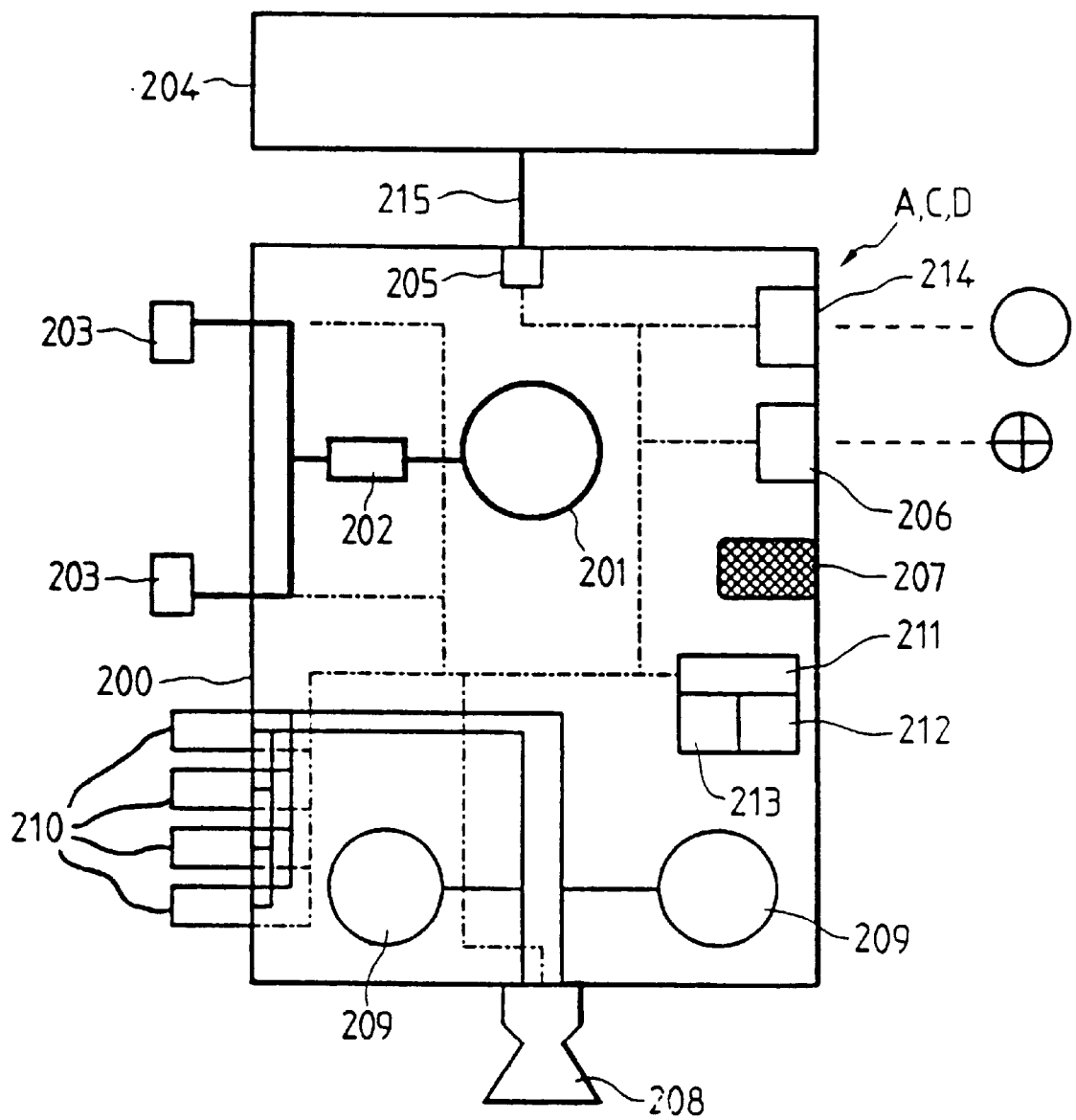
FIG. 2 is a block diagram showing one possible configuration for the on-board system of a satellite adapted to perform an orbit transfer in application of the method of the invention.

There follows, with reference to FIG. 2, a description of an example of a satellite launch system for implementing the invention.

A conventional launcher, not shown in the drawings, is associated with a first satellite B and with at least one second satellite A, an example of which is shown in FIG. 2. The launcher is adapted to place the first satellite B practically directly on its final orbit, so said satellite B can be entirely conventional including only correctional thrust means for supplying small trajectory-correcting impulses.

The second satellite A (which must be capable of performing various maneuvers after separating from the launcher and prior to reaching its final orbit) includes an on-board computer 211 associated with a clock 212 and data processing means 213 fitted with memories and serving to determine astronomical ephemeris for automatic piloting.

Satellite A is fitted with a thrust system that may be of chemical or of electrical type. FIG. 2 shows the case of a satellite A having both types of thrust system.

Thus, the body of the satellite 200 contains at least one xenon tank 201 feeding at least two electrical thrusters 203 via an expander/filter/valve assembly 202, which thrusters may be of the ion type having closed electron drift, or else may be of the arc jet type. Electrical power is provided by at least one solar panel 204 powering the satellite via an arm 215 and a rotary mechanism 205. For atmospheric braking in multiple passes, it is preferable to have two panels that are symmetrical about the body of the satellite.

The satellite may advantageously receive two laser reflectors 207 situated on two opposite faces enabling the distance of the satellite to be determined very accurately either relative to the earth, or relative to the moon (which has on its surface laser reflectors originally intended for space experiments, in the APOLLO and LUNAKHOD missions), thereby making it possible to aim very accurately into the inlet corridor for atmospheric braking.

The satellite may also receive a chemical thrust system (e.g. a hydrazine system or a two-propellent system) comprising at least one thruster 208 whose thrust (several hundreds of Newtons) is capable of providing speed increments that are substantially in impulse form, associated with one or more propellent tanks 209, and attitude control thrusters 210 associated with gyros.

The satellite also includes a variable field earth sensor 206 and at least one star sensor 214 (sun sensor or star sensor) providing two angular coordinates.

The star sensor 214 and the variable field earth sensor 206 in association with the ephemeris table included in the on-board computer 211 serve to compute angles between the thrust vector and the earth-satellite and sun-satellite directions, and thus to determine the attitude of the satellite A while it is maneuvering.

The gyros control the attitude control thrusters 210 which rotate the body of the second satellite so as to point the main thruster 208 in the aiming direction.

The on-board computer 211 controls both thrust systems.

In a first embodiment, the variable field earth horizon sensor 206 makes it possible to obtain the position of the earth, and reaction wheels maintain the attitude of the satellite A. The on-board computer 211 implements a relationship for controlling the electrical thrusters 203 which consist in stabilizing the thrust vector perpendicularly to the earth-satellite direction.

In another embodiment, the star sensor 214 and the ephemeris table included in the on-board computer 211 serve to determine the attitude of satellite A. Reaction wheels control satellite attitude. The on-board computer 211 implements a control relationship for the electrical thrusters which consist in pointing the thrust vector along an inertial direction.

At the cost of a moderate speed increment, which can be obtained using a low-power thrust system incorporated in the satellite that is to be placed on an orbit, the method of the invention makes it possible to change orbital planes in a way that cannot be performed directly using chemical thrust systems performing a conventional transfer, given the need to restrict on-board mass.

Table 1 below specifies, in km/s, the speed increments required firstly for a conventional transfer and secondly for a transfer in accordance with the method of the invention, for various examples of changing orbits between planes that do not coincide.

TABLE 1

Comparing conventional transfer speed increments with speed increments of the invention (in km/s)

|  | Conventional transfer | Transfer of the invention |
|---|---|---|
| Heliosynchronous orbit/GSO | 6 | 3 + 0.5 + 0.1 |
| GTO/heliosynchronous orbit (or circular orbit of arbitrary inclination) | 4.7 | 0.7 + 0.3 + 0.2 |
| Change inclination through 60° (between low circular obits) | 7.5 | 3 + 0.2 + 0.1 |

A first application of the invention is described above when showing how a satellite can be moved from a geostationary orbit to an inclined low circular orbit.

Under such circumstances, the first satellite B is placed into GTO or into super-synchronous transfer orbit 15. The second satellite A is placed into a super-synchronous waiting orbit 12bis of sufficient apogee altitude 19. Inclination is corrected at the apogee 19.

A trajectory correction in zone 5b makes it possible to adjust perigee altitude to the range 80 km to 160 km, with apogee 19a, 19b being diminished by successive passes through the atmosphere, and with the orbit being circularized.

The method of the invention makes it possible not only to use a single launcher to put two different satellites into non-coplanar orbits, but also to launch not only a satellite B which is placed on a geostationary orbit, but a constellation of satellites A, C, D which are placed simultaneously on orbits having different inclinations.

Under such circumstances, the satellites A, C, and D are launched onto a GTO orbit 12bis or onto a super-synchronous transfer orbit that is substantially equatorial. A mid-course correction in zone 5c, performed separately in each of said satellites A, C, and D, makes it possible for each satellite to aim for a different change of inclination in zone 5a. A second mid-course correction in zone 5b (on the half-return orbit) enables the altitude of each perigee to be adjusted. The orbit is circularized by atmospheric braking and by correction impulses, as before.

The invention also makes it possible to place a constellation of satellites A, C, and D on orbits of identical inclination, but of different periods.

The satellites A, C, and D are placed on super-synchronous orbits 12bis that are slightly different, using very small increments.

Inclination correction in zone 5a is the same for all of the satellites A, C, and D, but the period differences (small in relative value, but possibly being of the order of several hours in absolute value) lead to perigee pass times (assumed to be substantially equatorial) that are different, thereby leading to different periods determined on the basis of atmospheric braking. When using a heat shield 216, this method can enable a constellation to be put into place very quickly (whereas using conventional methods by differential precession, more than one month is required).

We claim:

1. A method of launching satellites simultaneously on non-coplanar orbits, in which a first satellite is put on a launcher suitable for placing said first satellite practically directly on a first final orbit having first orbital parameters with a first eccentricity value, a first inclination value, and a first apogee value, and in which at least one second satellite is put on the launcher to be placed on a second final orbit having second orbital parameters with a second eccentricity value, a second inclination value, and a second apogee value which are substantially different from the corresponding values of the first orbital parameters provided by the launcher and applied to the first satellite launched simultaneously with the second satellite, wherein, to place the second satellite on its orbit, a first maneuver is performed to transfer it onto a highly elliptical waiting orbit having an apogee that is situated typically in the range 50,000 km to 400,000 km, and having a semi-major axis situated in the initial orbit plane, during a second maneuver situated in the vicinity of the apogee of the waiting orbit, the inclination and the perigee of the waiting orbit are changed to place the second satellite on an intermediate orbit, a third maneuver is performed for mid-course correction of the intermediate orbit, a fourth maneuver is performed, including at least one step that makes use of atmospheric breaking in the vicinity of the perigee of the intermediate orbit, to lower the altitude of the apogee of the intermediate orbit, and a fifth maneuver is performed during which an impulse is supplied to the second satellite at apogee of the intermediate orbit so as to raise its perigee and transform the intermediate orbit into said second final orbit constituted by an inclined low orbit.

2. A method according to claim 1, wherein the period TA of the waiting orbit is determined so that the apogee of said waiting orbit is visible from a ground station, and wherein the second maneuver which is situated in the vicinity of the apogee of the waiting orbit is controlled from the ground station.

3. A method according to claim 1, wherein the third maneuver for mid-course correction of the intermediate orbit makes it possible to situate the perigee of the intermediate orbit at an altitude in the range 80 km to 140 km.

4. A method according to claim 1, wherein the fourth maneuver which includes at least one step implementing atmospheric braking, uses the attitude control of the second satellite in such a manner that the braking axis of said satellite is substantially in alignment with its velocity vector.

5. A method according to claim 1, wherein the fourth maneuver comprises a set of steps implementing atmospheric braking so as to lower the apogee altitude of the intermediate orbit at each step.

6. A method according to claim 1, for launching a plurality of second satellites simultaneously onto final orbits constituted by low altitude orbits, and in particular low circular orbits of different inclinations, while a first satellite is placed on a first final orbit constituted by a geostationary transfer orbit of low inclination, or by a super-geostationary transfer orbit, wherein, during the second maneuver, a mid-course correction at the go half-orbit position of the waiting orbit is performed separately on each second satellite enabling each second satellite to aim for a different change of inclination at apogee of the waiting orbit, and during the third maneuver, a second mid-course correction is performed for each second satellite on each intermediate orbit to adjust the altitude of each perigee of each intermediate orbit.

7. A method according to claim 1, for launching a plurality of second satellites simultaneously on final orbits constituted by low altitude orbits while the first satellite is placed on a first final orbit constituted by a geostationary transfer orbit of low inclination, or by a super-geostationary transfer orbit, wherein, during the first maneuver, the second satellites are transferred onto slightly different super-synchronous waiting orbits by supplying very small speed increments, and during the second maneuver, identical inclination changes are performed on all of the second satellites so as to place them on intermediate orbits that are similar but having different periods, leading to different times when the various second satellites pass through perigee of the intermediate orbits such that at the end of the fifth maneuver, the various second satellites are placed on the same final orbit constituted by an inclined low orbit, while being at mutually different phases thereon.

8. A satellite launching system for implementing the method of claim 1, wherein the system comprises a launcher, a first satellite disposed on the launcher which is adapted to place said first satellite practically directly on a first final orbit, and at least one second satellite designed to be placed on a second final orbit different from said first final orbit, and wherein the second satellite is fitted with an on-board computer and with a chemical thrust system comprising a main thruster on-board said second satellite, and attitude control thrusters.

9. A system according to claim 8, wherein said second satellite includes a star sensor, a variable field earth sensor, and an ephemeris table included in the on-board computer making it possible to compute angles between the thrust vector and the earth-satellite direction and the sun-satellite direction, and thus to determine the attitude of the second satellite while maneuvering.

10. A system according to claim 8, wherein said second satellite further includes gyros controlling the attitude control thrusters causing the body of the second satellite to rotate so as to point the main thruster in the aiming direction.

11. A system according to claim 8, wherein the body of the second satellite is provided with at least two laser retro-reflectors making it possible by laser telemetry to determine very accurately the position of said second satellite prior to the mid-course correction maneuvers of the third maneuver.

12. A system according to claim 8, wherein the second satellite includes at least two solar panels that are disposed symmetrically about the body of said second satellite.

13. A system according to claim 8, wherein the second satellite includes at least one solar panel and a heat shield.

14. A satellite launching system for implementing the method of claim 1, wherein the system comprises a launcher, a first satellite disposed on the launcher which is adapted to place said first satellite practically directly on a first final orbit, and at least one second satellite designed to be placed on a second final orbit different from said first final orbit, and wherein the second satellite is fitted with an on-board computer and also an electrical thrust system comprising at least high specific impulse electrical thrusters on-board said second satellite, the electrical thrusters being capable of being of the ionic type, of the arc jet type, or of the closed electron drift type.

15. A system according to claim 10, wherein the second satellite includes a variable field earth horizon sensor for obtaining the position of the earth, and reaction wheels for determining the attitude of the second satellite, and wherein the on-board computer implements a control relationship for the electrical thrusters which consist in stabilizing the thrust vector perpendicularly to the earth-satellite direction.

16. A system according to claim 14, wherein the second satellite includes a star sensor together with an ephemeris table included in the on-board computer to determine the attitude of said second satellite, and reaction wheels for determining the attitude of said second satellite, and wherein the on-board computer implements a control relationship for the electrical thrusters which consist in pointing the thrust vector along an inertial direction.

* * * * *

UNITED STATES PATENT AND TRADEMARK OFFICE
CERTIFICATE OF CORRECTION

PATENT NO    : 5,961,077
DATED        : October 5, 1999
INVENTOR(S)  : Christophe Koppel, et al.

It is certified that error appears in the above-identified patent and that said Letters Patent are hereby corrected as shown below:

Column 9, lines 18 and 19, please delete "practically directly"; and

Column 10, line 58, "the aiming direction", should read --an aiming direction--.

Signed and Sealed this

Eighth Day of May, 2001

*Attest:*

NICHOLAS P. GODICI

*Attesting Officer*      Acting Director of the United States Patent and Trademark Office